(12) United States Patent
Wolf

(10) Patent No.: US 12,249,799 B2
(45) Date of Patent: Mar. 11, 2025

(54) MOUNTING AID

(71) Applicant: HARTING Electric Stiftung & Co. KG, Espelkamp (DE)

(72) Inventor: Torsten Wolf, Lübbecke (DE)

(73) Assignee: HARTING Electric Stiftung & Co. KG, Espelkamp (DE)

(*) Notice: Subject to any disclaimer, the term of this patent is extended or adjusted under 35 U.S.C. 154(b) by 407 days.

(21) Appl. No.: 17/639,017

(22) PCT Filed: Sep. 14, 2020

(86) PCT No.: PCT/DE2020/100799
§ 371 (c)(1),
(2) Date: Feb. 28, 2022

(87) PCT Pub. No.: WO2021/058057
PCT Pub. Date: Apr. 1, 2021

(65) Prior Publication Data
US 2022/0311199 A1      Sep. 29, 2022

(30) Foreign Application Priority Data

Sep. 25, 2019    (DE) .................... 10 2019 125 797.2

(51) Int. Cl.
*H01R 13/512*    (2006.01)
*H01R 9/26*      (2006.01)
(Continued)

(52) U.S. Cl.
CPC ......... *H01R 43/205* (2013.01); *H01R 13/514* (2013.01); *H01R 13/518* (2013.01);
(Continued)

(58) Field of Classification Search
CPC .. H01R 13/514; H01R 13/518; H01R 12/724; H01R 12/716; H01R 9/2608; H01R 25/14; H01R 43/205; H02B 1/052
See application file for complete search history.

(56) References Cited

U.S. PATENT DOCUMENTS 3,547,274 A  * 12/1970 Sosinkski ............ H01R 13/518
                                                        248/314
5,277,601 A     1/1994 Miyazawa
(Continued)

FOREIGN PATENT DOCUMENTS

CN            1219009 A       6/1999
CN            2344885         10/1999
(Continued)

OTHER PUBLICATIONS

Hogan et al, "SMT connectors for removable small-form-factor transceiver modules," 2000 Proceedings. 50th Electronic Components and Technology Conference (Cat. No. 00CH37070), Las Vegas, NV, USA, 2000, pp. 1164-1172. (Year: 2000).*

*Primary Examiner* — A. Dexter Tugbang
(74) *Attorney, Agent, or Firm* — Smartpat PLC

(57) ABSTRACT

A mounting device functions to support a connection process of at least one module of a modular circuit board connector to at least one connection element. The mounting device comprises at least one base plate and at least one tongue arranged essentially perpendicular on the base plate and running parallel to the longitudinal axis of the base plate. The tongue is at least partially designed to received the at least one module.

11 Claims, 4 Drawing Sheets

(51) Int. Cl.
  *H01R 13/514* (2006.01)
  *H01R 13/518* (2006.01)
  *H01R 43/20* (2006.01)
  H01R 12/71 (2011.01)
  H01R 12/72 (2011.01)
  H01R 25/14 (2006.01)
  H02B 1/052 (2006.01)

(52) U.S. Cl.
  CPC .......... *H01R 9/2608* (2013.01); *H01R 12/716* (2013.01); *H01R 12/724* (2013.01); *H01R 25/14* (2013.01); *H02B 1/052* (2013.01)

(56) References Cited

U.S. PATENT DOCUMENTS

| | | |
|---|---|---|
| 5,910,023 A | 6/1999 | McHugh et al. |
| 6,547,588 B1 | 4/2003 | Hsu et al. |
| 6,848,951 B1 * | 2/2005 | Bechaz .................. H02B 1/052 439/716 |
| 2004/0111879 A1 | 6/2004 | Ramirez et al. |
| 2006/0240683 A1 | 10/2006 | Bré et al. |
| 2006/0240707 A1 * | 10/2006 | Bre' ....................... H02B 1/052 439/532 |
| 2020/0176918 A1 | 6/2020 | Wolf |

FOREIGN PATENT DOCUMENTS

| | | |
|---|---|---|
| CN | 2357420 | 1/2000 |
| DE | 102017119287 A1 | 2/2019 |
| EP | 0756364 B1 | 1/1997 |
| EP | 1717921 A1 | 11/2006 |
| JP | 2016192257 A * | 11/2016 |

* cited by examiner

MOUNTING AID

TECHNICAL FIELD

The disclosure relates to a mounting aid for fixing modular circuit board connectors to a connection element.

BACKGROUND

DE 10 2017 119 287 A1 shows a modular connector for mounting on a circuit board, wherein the connector can be assembled from a plurality of individual connector modules, and wherein the connector modules can be connected by means of at least one coupler. To this end, the connector modules have dovetail guides, the coupler being inserted flush into the connector modules.

In order to be able to utilize the space of a circuit board optimally, the modules of a modular circuit board connector are dimensioned minimally. Accordingly, so-called "male" modules, that is to say modules of a circuit board connector for receiving pin contacts, are formed with comparatively thin walls, in order to be able to have/receive an aforesaid dovetail guide. Connected to a connection element, this thin-walled form is not a disadvantage but individual modules, in particular of the "male" design, are initially prone to improper handling.

The German Patent and Trade Mark Office has searched the following state of the art in the priority application relating to the present application: US 2004/0111879 A1.

SUMMARY

An object of the disclosure consists in meeting the requirements which result from the thin-walled design of some modules during the mounting of a modular circuit board connector, in a simple and inexpensive manner.

The object is achieved by a mounting device as claimed. The mounting device is used to support a connection process of at least one module of a modular circuit board connector to at least one connection element. The mounting device comprises at least one base plate and at least one tongue arranged substantially perpendicularly on the base plate and extending parallel to the longitudinal axis of the base plate, wherein the tongue is at least partly designed to receive the at least one module. In this connection, "mounting device" means an auxiliary tool which is used for the mounting purpose. Following the mounting, the mounting device is removed from the modules to be mounted and can be reused. "Modular circuit board connector" basically means connectors for circuit boards. The circuit board connectors can be assembled from a plurality of building blocks, designated "modules". Modular circuit board connectors can be assembled from a plurality of identical modules or from any desired different modules. The term "base plate" primarily means a simple, basically flat, plate. Further designs can provide arranged shape elements or recesses. The term "tongue" should primarily be understood as a plane projecting from the base plate.

In a preferred embodiment, the tongue of the mounting device has, at least for the most part, a length equal to the length of the base plate. The mounting device therefore assumes approximately the shape of a T-profile. Thus, the total length of the mounting device can be used to receive the modules to be connected.

A further embodiment provides for the tongue to be formed with a groove extending parallel to the longitudinal axis of the base plate, wherein the groove is designed to accommodate at least one contact element of a module. This means that at least one electrically conductive contact element of a module received in the mounting device is moved into the groove. Ideally, this movement into the groove of the contact element is done without any direct contact with the mounting device. In other words, a module is attached to the mounting device in such a way that an approximately U-shaped insulating body of the module is placed with the opening of the U on the tongue of the mounting device. A contact element located within the U is moved into the groove within the tongue, so that the mounting of the modules with the connection element for the contact elements is performed without damage.

In a more developed embodiment, the tongue is formed with at least one chamfered edge on its side opposite the base plate. Expediently, in a tongue with an incorporated groove, the chamfers are directed outward on both sides. This means that the two webs of the tongue that are formed by the groove each have a chamfer, at least on their side facing away from the groove. By means of the chamfers, better and quicker engagement of the mounting device in the corresponding modules to be mounted can be ensured.

A clever embodiment further provides for the tongue to have at least one stop along its longitudinal axis, at least at one end, wherein the stop is arranged transversely and perpendicular to the longitudinal axis of the base plate. In other words, another plate is added transversely to the tongue and perpendicularly on the base plate. This plate serves as a stop to align modules to be connected with this stop. If the tongue is provided with a groove, the groove can also be formed by this additional plate.

In one embodiment, the mounting device further provides for the base plate to have at least one recess on the opposite side of the tongue, wherein the recess extends parallel to the longitudinal axis of the base plate. This recess is shaped in such a way that the opposing modules of the modules which are mounted on the tongue side can be held. In the further course, it is assumed that so-called "male" modules are received and mounted on the tongue side of the mounting device. Consequently, the recess is provided to receive at least one circumferential side of the corresponding "female" modules, in order to make their mounting easier. This means that the mounting device is capable of being designed universally for the mounting of corresponding modules of a system for modular circuit board connectors.

Expediently, one embodiment provides for the recess to have, at least for the most part, the length of the base plate. If the tongue is also formed over a comparable length in a corresponding embodiment, corresponding modules of the circuit board connector can be mounted more easily. As a result, the mounting of modular circuit board connectors in both "male" and in "female" versions that are matched to each other is made easier by a mounting device.

In a further embodiment of the mounting device, the base plate is formed with at least one chamfered edge toward the recess. The chamfer in the recess is also intended to ensure faster engagement of the mounting tool and of the modules of a circuit board connector to be connected. Furthermore, an appropriate module can itself be formed with a chamfered edge, whereby secure retention of the module in the mounting device is achieved.

Finally, one embodiment provides for the recess to provide at least one stop, at least at one end, wherein the stop is arranged transversely and perpendicular to the longitudinal axis of the base plate. This stop ensures a simple and reliable possible way of aligning modules to be connected before the connection to a connection element. The stop can be formed in many parts. In addition, the stop can be arranged with a form fit on the base plate. Alternatively, the stop can be attached to the base plate by a force fit. The stop is preferably integrally molded on the base plate.

BRIEF DESCRIPTION OF THE DRAWINGS

An exemplary embodiment of the invention is illustrated in the drawings and will be explained in more detail below.

DETAILED DESCRIPTION

The figures contain partly simplified schematic illustrations. To some extent, identical designations are used for the same but possibly not identical elements. Different views of the same elements can be scaled differently. Statements of direction such as, for example, "left", "right", "top" and "bottom" are to be understood with reference to the respective figure and can vary with respect to the object illustrated in the individual illustrations.

Figure 1:
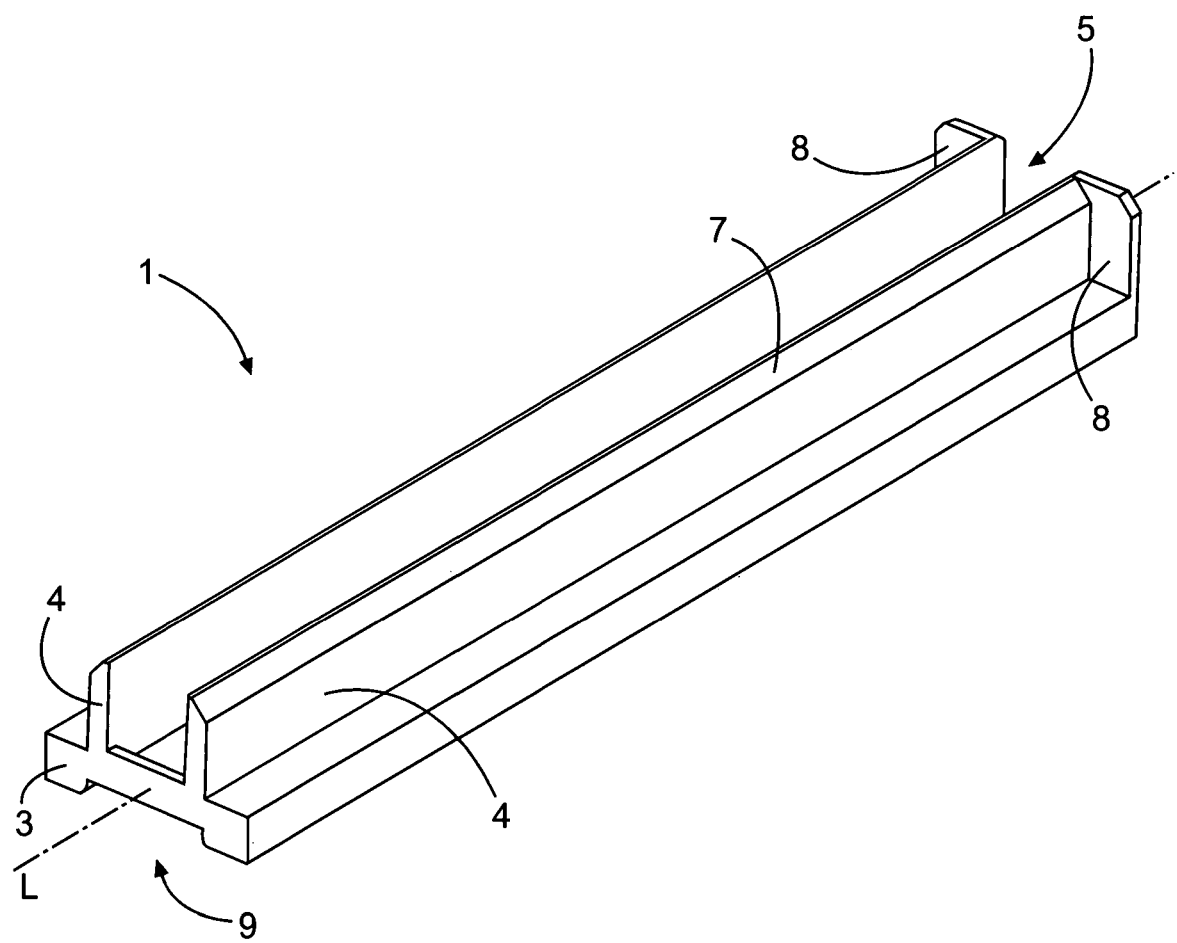
FIG. 1 shows a perspective illustration of a mounting device.

FIG. 1 shows a preferred embodiment of a mounting device 1. The embodiment illustrated firstly has the base plate 3. A tongue 4 projects vertically out of the base plate 3. In principle, the tongue 4 extends parallel to the longitudinal axis L of the base plate 3. The tongue 4 is provided with a groove 5. In the illustration, it becomes clear that the tongue 4 has a respective chamfered edge 7 on the sides facing away from the groove 5. A plate, which functions as a stop 8, is located on the tongue 4. This plate, formed as a stop 8, is aligned perpendicularly on the base plate 3 and transversely to the longitudinal axis L of the base plate 3. In this embodiment, this stop 8 is divided into two sections by the groove 5. It is also indicated that the base plate 3 has a recess 9 on its rear side, illustrated only from FIG. 3 onward.

Figure 2:
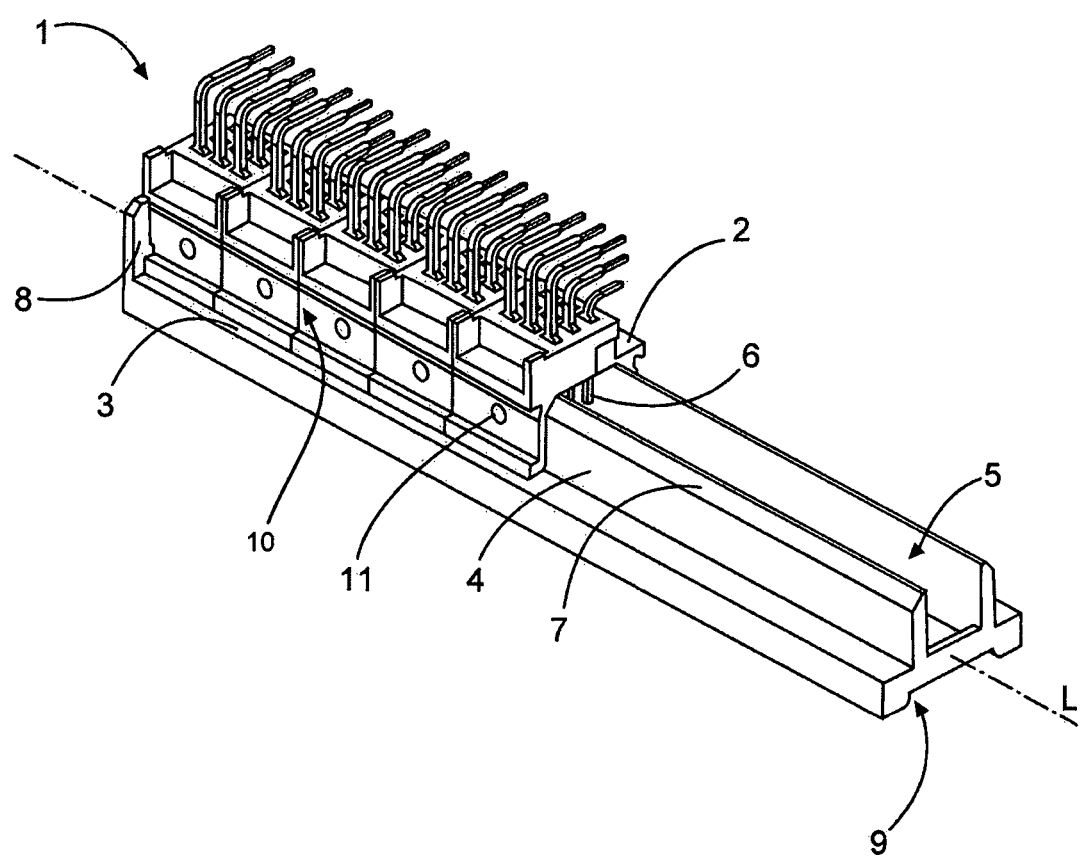
FIG. 2 shows a further perspective illustration of a mounting with attached modules of a modular circuit board connector.

FIG. 2 shows an illustration of the mounting device 1, pivoted horizontally by about 90° as compared with FIG. 1. This illustration is also at least partly populated with exemplary embodiments of modules 2 of a modular circuit board connector. Five modules 2 are illustrated. The modules 2 illustrated are identical but it is also possible to use modules which belong to the related system but are not identical to the modules 2 illustrated. The "male" modules 2 illustrated basically form a U-shaped profile in the embodiment illustrated. Contact elements 6 are arranged inside the U-shaped profile of the modules 2. In order that these contact elements 6 are not damaged, the groove 5 formed in the tongue 4 is provided. During the mounting of the modular circuit board connector, the contact elements 6 can remain in the groove 5 once the modules 2 are placed on the mounting device 1. In this embodiment, the chamfered edges 7 of the tongue 4 rest closely against a wedge-shaped recess in the module 2 illustrated. The stop 8 ensures that all the attached modules 2 can be pushed along the longitudinal axis L against the stop 8. As a result, the attachment of a connection element (not illustrated) is further simplified. Cleverly, modules 2 have shaped elements 11 on their dovetail groove 10, which can be brought into engagement with a connection element in order to secure the modules 2 in the axial direction on the dovetail-shaped connection element.

Figure 3:
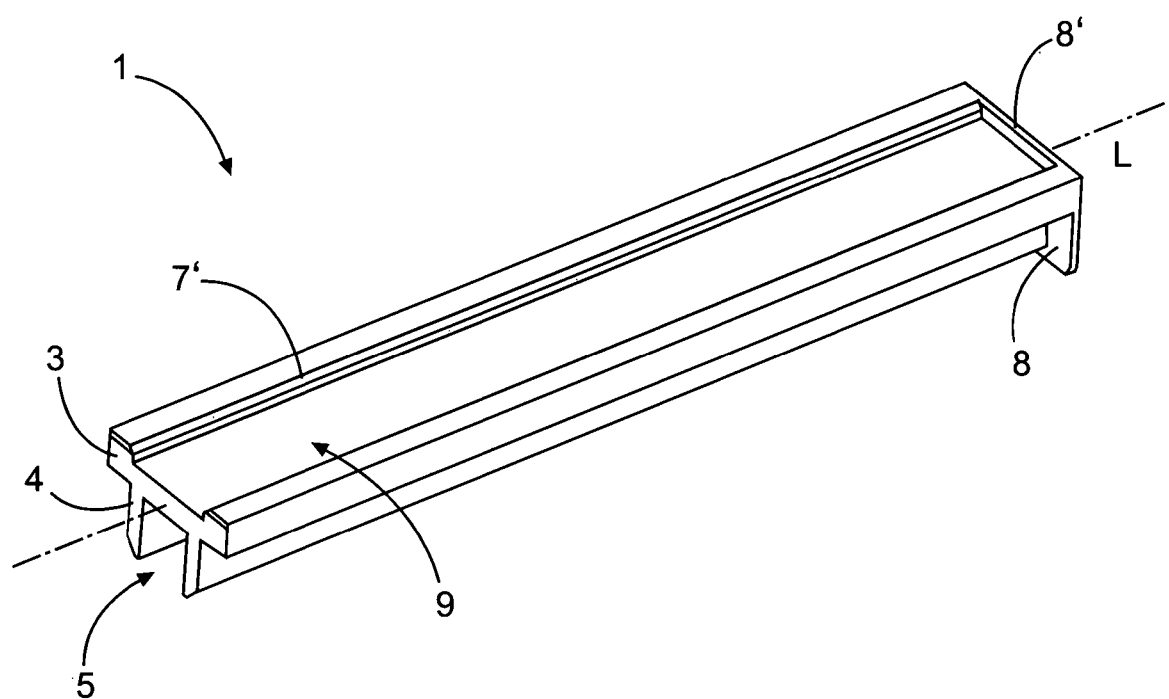
FIG. 3 shows a rear illustration of a mounting device.

A view of the rear side or underside of the mounting device 1 is illustrated in FIG. 3. Here, it can be seen that a recess 9 is formed parallel to the longitudinal axis L of the base plate 3. The transitions between the base plate 3 and the recess 9 are provided with chamfered edges 7'. These simplify the insertion of the corresponding modules 2' to be connected. A stop 8' is also provided on this side of the mounting device 1. This again ensures a limitation of the displacement travel of attached modules 2' in a direction of the longitudinal axis L. A use of stops at both ends of the longitudinal direction L of the base plate 3 may likewise be advantageous. Furthermore, the stop 8' can be connected to the stop 8. In the embodiment shown, the entire mounting device 1 consists of a cast component. This also means that the stop 8' and the stop 8 can be shaped from one component, should the mounting device 1 be produced in many parts.

Figure 4:
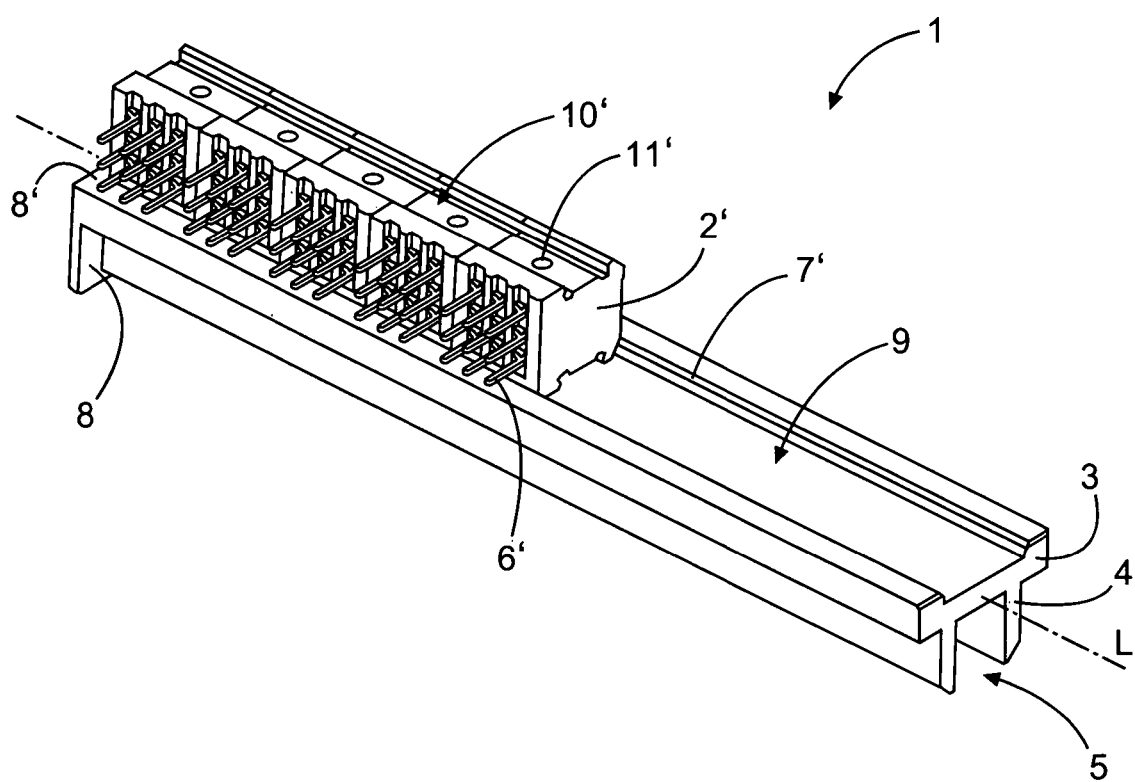
FIG. 4 shows a rear illustration of a mounting device with attached modules of a modular circuit board connector.

A rear side or underside of the mounting device 1, at least partly populated with modules 2', is illustrated in FIG. 4. As compared with FIG. 3, the illustration has been pivoted by about 90° in the horizontal plane. In the similar way to that in FIG. 2, five modules 2' are shown, the modules 2' shown being "female" modules 2'. After they have been fixed to a connection element (not shown), these modules 2' can be used as a "female" part of a modular circuit board connector. This modular circuit board connector can be connected to a correspondingly populated "male" circuit board connector, by being plugged into each other. The modules 2' are inserted on one side into the recess 9, which is connected to a connection element. The illustration reveals that a chamfer on the module 2', together with a chamfered edge 7', ensures that when a force is applied in the direction of the mounting device 1, the module 2' is pressed securely into the recess 9 and is held there relative to the base plate 3 by the edges of the recess 9. Cleverly, the recess 9 is designed to be just so deep that the contact elements 6' of the module 2' do not come directly into contact with the base plate 3. This prevents the contact elements 6' from being damaged/affected during a mounting operation.

Even if various aspects of features of the invention are each shown in combination in the figures, it is obvious to those skilled in the art—if not otherwise specified—that the combinations illustrated and discussed are not the only ones possible. In particular, units or feature combinations from different exemplary embodiments that correspond to one another can be interchanged with one another.

LIST OF REFERENCE NUMBERS

1 Mounting device
2, 2' Module
3 Base plate
4 Tongue
5 Groove
6, 6' Contact element
7, 7' Chamfered edge
8, 8' Stop
9 Recess
10, 10' Dovetail groove
11, 11' Shape element
L Longitudinal axis

The invention claimed is:
1. A mounting tool (1) for supporting an assembly process of modular circuit board connector modules (2) to a connection element, the mounting tool (1) comprising:
a base plate (3); and a tongue (4) arranged substantially perpendicularly on the base plate (3) and extending parallel to a longitudinal axis (L) of the base plate (3), wherein the tongue (4) is designed to temporarily receive the modular circuit board connector modules (2), wherein the tongue (4) is arranged centrally on the base plate (3), wherein the base plate (3) extends laterally on both sides beyond the tongue (4), wherein the tongue (4) has a stop (8), at one end, wherein the stop (8) is arranged transversely and perpendicular to the longitudinal axis (L) of the base plate (3), and wherein the stop (8) allows the modular circuit board connector modules (2) received on the tongue (4) to be pushed along the longitudinal axis (L) against the stop (8).

2. The mounting tool (1) as claimed in claim 1, wherein the tongue (4) has a length equal to a length of the base plate (3).

3. The mounting tool (1) as claimed in claim 1, wherein the tongue (4) has a groove (5) extending parallel to the longitudinal axis (L) of the base plate (3), wherein the groove (5) is designed to accommodate contact elements (6) of the modular circuit board connector modules (2).

4. The mounting tool (1) as claimed in claim 1, wherein the tongue (4) is formed with two outwardly directed chamfered edges (7) opposite the base plate (3).

5. The mounting tool (1) as claimed in claim 1, wherein the base plate (3) has a recess (9) on a side opposite of the tongue (4), wherein the recess (9) extends parallel to the longitudinal axis (L) of the base plate (3).

6. The mounting tool (1) as claimed in claim 5, wherein the recess (9) has a length equal to a length of the base plate (3).

7. The mounting tool (1) as claimed in claim 5, wherein the base plate (3) is formed with chamfered edges (7') toward the recess (9).

8. The mounting tool (1) as claimed in claim 5, wherein the recess (9) is configured to temporarily receive further modular circuit board connector modules (2').

9. The mounting tool (1) as claimed in claim 8, wherein modular circuit board connector modules (2) are male connector modules (2) and the further modular circuit board connector modules (2') are corresponding female connector modules.

10. The mounting tool (1) as claimed in claim 1, wherein the tongue (4) includes
two webs extending perpendicular from the base plate and
a groove (5) extending parallel to the longitudinal axis (L) of the base plate (3), wherein each of the two webs includes an outwardly directed chamfered edge (7) at an end opposite the base plate (3), wherein the groove (5) is designed to accommodate contact elements (6) of the modular circuit board connector modules (2), and wherein the outwardly directed chamfered edges (7) are designed to allow corresponding wedge-shaped recesses in the modular circuit board connector modules (2) to rest thereon.

11. A mounting tool (1) for supporting an assembly process of modular circuit board connector modules (2) to a connection element, the mounting tool (1) comprising:
a base plate (3); and
a tongue (4) arranged substantially perpendicularly on the base plate (3) and extending parallel to a longitudinal axis (L) of the base plate (3), wherein the tongue (4) is designed to temporarily receive the modular circuit board connector modules (2), wherein the tongue (4) is arranged centrally on the base plate (3), wherein the base plate (3) extends laterally on both sides beyond the tongue (4), wherein the base plate (3) has a recess (9) on a side opposite of the tongue (4), wherein the recess (9) extends parallel to the longitudinal axis (L) of the base plate (3), wherein the recess (9) has a stop (8'), at one end, and wherein the stop (8') is arranged transversely and perpendicular to the longitudinal axis (L) of the base plate (3).

\* \* \* \* \*